No. 891,742. PATENTED JUNE 23, 1908.
F. P. SMITH.
SYSTEM OF SEWAGE DISPOSAL.
APPLICATION FILED NOV. 23, 1904.
2 SHEETS—SHEET 2.
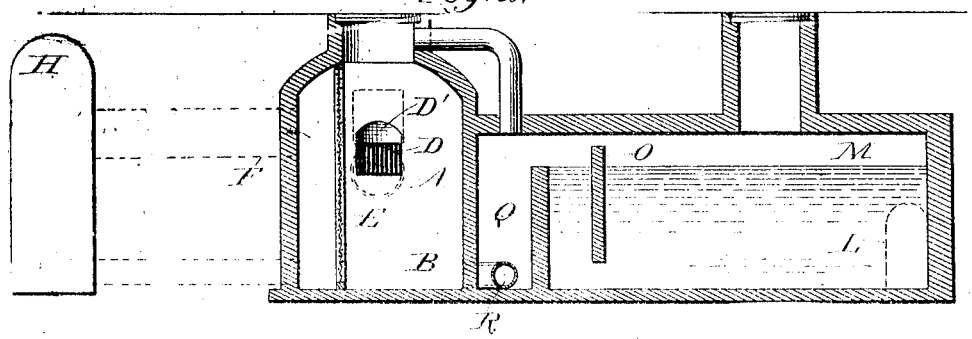
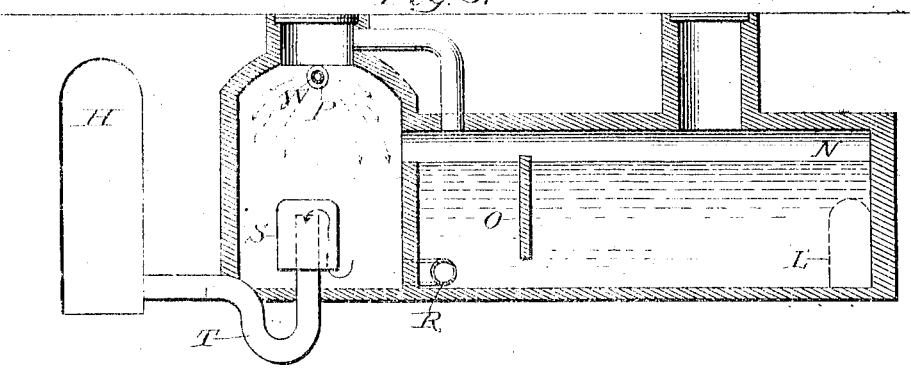
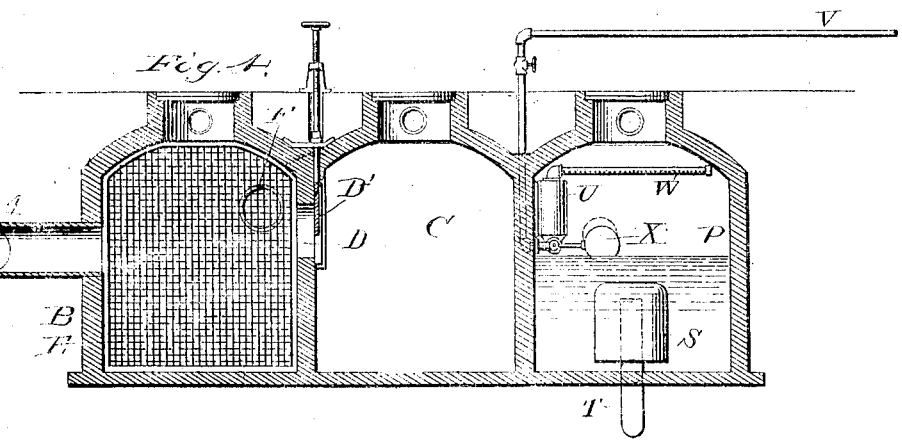
Witnesses
J Stewart Rice
Fannie Wise
Inventor:
Fred P. Smith,
by Dodge and Sons,
Attys.

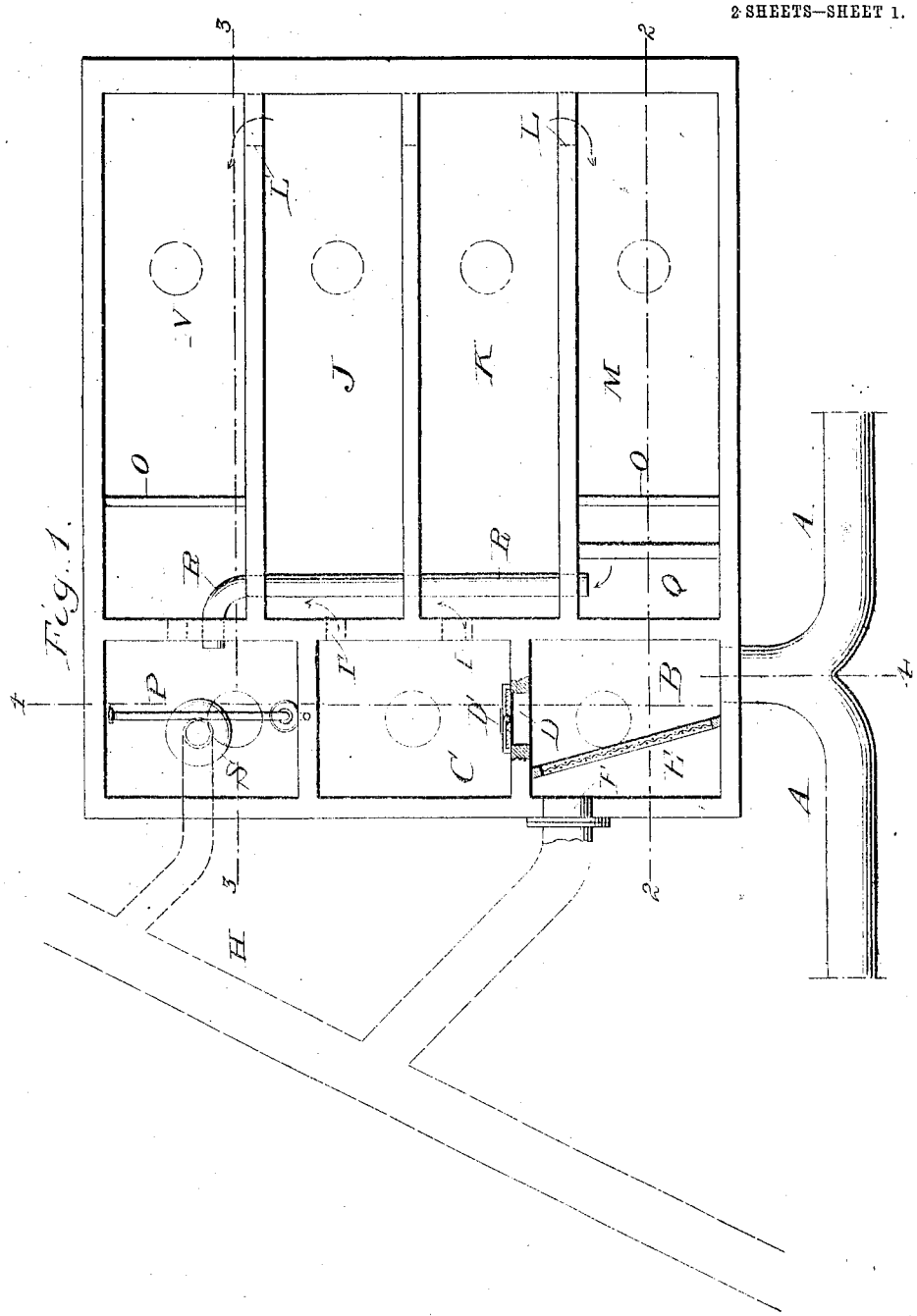

UNITED STATES PATENT OFFICE.

FRED P. SMITH, OF KANSAS CITY, KANSAS, ASSIGNOR OF ONE-HALF TO EDWARD C. LEWIS, OF CHICAGO, ILLINOIS, AND JOHN H. KITCHEN, OF KANSAS CITY, MISSOURI, COPARTNERS DOING BUSINESS AS LEWIS & KITCHEN, OF KANSAS CITY, MISSOURI, A FIRM.

SYSTEM OF SEWAGE DISPOSAL.

No. 891,742.

Specification of Letters Patent.   Patented June 23, 1908.

Application filed November 23, 1904. Serial No. 234,082.

*To all whom it may concern:*

Be it known that I, FRED P. SMITH, a citizen of the United States, residing at Kansas City, in the county of Wyandotte and State of Kansas, have invented certain new and useful Improvements in Systems of Sewage Disposal, of which the following is a specification.

My present invention pertains to improvements in sewage disposal, the construction and advantages of which will be hereinafter set forth, reference being had to the annexed drawings, wherein:

Figure 1 is a plan of the system employed in carrying out my invention; Fig. 2 a vertical sectional view, on the line 2—2 of Fig. 1; Fig. 3 a similar view, on the line 3—3 of Fig. 1; and Fig. 4 a vertical sectional view on the line 4—4 of Fig. 1.

The main object of my invention is to provide a sewage system in which, under normal conditions, the sewage may be passed through septic tanks, the solids removed and the clarified water free from matter in suspension subjected to a suitable chemical before being finally discharged.

A further object is to so construct the apparatus that the clarified water will be periodically discharged and at the same time subjected to chemical treatment.

A still further object is to so construct the apparatus that any excess or surplus of water, due to rain, may pass out of the apparatus through a suitable by-pass or overflow, without passing through the septic tanks and flush tank.

Referring to the drawings, A denotes the sewage inlet, which communicates with a catch-basin B, which in turn communicates with a sediment vat C, through an opening D, Figs. 1 and 4, located at a sufficient height to insure the retention of the greater portion of the solid matter carried by the sewage. An adjustable valve D' is provided for the opening D, in order that the flow of sewage from the catch-basin to the sediment vat may be regulated as desired.

A screen E extends lengthwise of the catch basin to one side of the inlet and opening D; and a second outlet F is formed in the wall of the basin at a point somewhat higher than the outlet D. As will be seen upon reference to Fig. 1, screen E stands between the inlet and the secondary or overflow outlet F. Ordinarily the sewage passes through opening D, but in case of an excessive fall of rain, or a sudden freshet, the water will rise in the catch-basin and pass through opening F into a pipe or conduit G which connects with a main sewer or culvert H.

Sediment vat C connects through openings I, I' with tanks J, K, which may be termed the crude septic tanks. Said tanks in turn are in communication, respectively, through openings L, L', with tanks M and N, which may be called the clarified septic tanks. Each of the tanks M and N is provided with a retarding wall or bridge O, located adjacent to the overflow wall of the tank. Tank N is in direct communication with the flush tank P, while the discharge chamber Q of tank M is in communication with said flush tank through pipe R. Thus it will be seen that the sewage passes first into catch-basin B, thence into the sediment vat or chamber C, to the crude septic tanks J and K, to the tanks M and N, and finally into the flush tank P. The solid matters will thus have a chance to separate, and all decomposible substances will be broken up and decomposed in the septic tanks, so that the water which passes to the flush tank will carry all soluble matters but be free from matter in suspension. Each tank, basin or vat will be provided with a suitable manhole, in order that accumulated matter may be removed.

Flush tank P has a siphon S, of any approved type, said siphon controlling the passage of liquid from the tank through a pipe T, which leads to any desired point. The siphon comes into action when the liquid in the tank reaches a predetermined level, as will be readily understood.

In order to properly treat the clarified liquid as it passes from the septic tanks M and N into the flush tank P, an automatic chemical-applying device is used. In the upper portion of the flush-tank is located a cylinder or reservoir U, best shown in Fig. 4, said reservoir being designed to hold crystallized sulfate of copper or the like. The lower end of said reservoir is connected to a service water pipe V, and from the upper end of the reservoir projects a perforated pipe W, said pipe extending across the reservoir, so as to spray the liquid which passes therefrom over the entire surface of the body of water contained in the flush tank.

An automatic float-valve X is placed in the pipe V, said valve being controlled by the height of the water in the flush tank, so that as the water nearly reaches its highest point therein the valve (through the action of the float) will be opened and permit the city water-pressure to pass through the reservoir U and contained chemical and force a solution out through the pipe W, thereby spraying the surface of the water in the flush tank, which action will continue until the water in the tank falls below that level which will cause the float to again fall and close the valve. It will thus be seen that each charge of water which is siphoned off from the flush tank is chemically treated, so that all germ life and noxious vapors which might arise therefrom will be destroyed, and the water which passes from the system into the main sewer or culvert H will be entirely innocuous and free from solid matters.

Under normal conditions, all the sewage will psas through the septic tanks and the flush tank and be treated in the manner hereinbefore set forth. When, however, a freshet occurs, the excess water will pass out through the opening F and pipe G, so as not to destroy the action of the tanks, which will continue to operate in the manner above set forth. The screen E prevents any solid matters from passing out through the opening F.

No claim is herein made to the particular form of septic tank shown, as this subject-matter is reserved for a future application.

While sulfate of copper has been specifically mentioned as the chemical agent to be used for the treatment of the water resulting from the septic system, any other germicide and deodorant may be employed.

Having thus described my invention, what I claim is:

1. In combination with a catch-basin adapted and designed to receive sewage; a septic tank system connected therewith and receiving the sewage under normal conditions; and a by-pass or overflow extending from the catch-basin, said by-pass or overflow coming into operation to relieve the tank system from flooding under abnormal inflow of sewage or rain-water.

2. In combination with a catch-basin adapted and designed to receive sewage; a septic system connected with said catch-basin; an overflow extending from the upper portion of said catch-basin at a point above the outflow for the sewage to the septic system; and a screen for said overflow.

3. In combination with a catch-basin adapted and designed to receive sewage; a septic tank system connected therewith and arranged to receive sewage under normal conditions; an overflow connected to said catch-basin and opening into the same at a point above the level of the outlet from said catch-basin; and means for automatically subjecting the discharge from the septic tank system to the action of a chemical solution.

4. In combination with a catch-basin adapted and designed to receive sewage; a septic tank system connected therewith; a flush tank connected with the opposite end of the septic tank system; a siphon for periodically discharging the flush tank; a reservoir mounted within the flush tank, said reservoir being adapted to contain a chemical or the like; a water pipe leading to said tank; an automatic valve located within said pipe; and a spraying device connected to the opposite end of the reservoir, substantially as and for the purpose described.

In testimony whereof I have signed my name to this specification in the presence of two subscribing witnesses.

FRED P. SMITH.

Witnesses:
HORACE A. DODGE,
FANNIE WISE.